(12) United States Patent
Lindner (10) Patent No.: US 6,371,280 B1
(45) Date of Patent: Apr. 16, 2002

(54) LOAD CARRYING BELT

(75) Inventor: Daniel John Lindner, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/533,642

(22) Filed: Mar. 22, 2000

(51) Int. Cl.[7] .............................................. B65G 15/42
(52) U.S. Cl. ................................ 198/690.2; 198/699.1
(58) Field of Search .......................... 198/690.2, 699.1; 152/209.1, 209.2, 209.8, 209.12, 209.28; D12/136, 149

(56) References Cited

U.S. PATENT DOCUMENTS

| | | | |
|---|---|---|---|
| 463,110 A | 11/1891 | Dryden | |
| 810,510 A | 1/1906 | Robins, Jr. | |
| 2,784,835 A | 3/1957 | Dixon | |
| 2,909,271 A | 10/1959 | Taylor | |
| 3,853,016 A | 12/1974 | Lane, III et al. | 74/231 C |
| 4,386,493 A | 6/1983 | Holdemann et al. | 56/341 |
| 4,426,926 A | 1/1984 | Soteropulos et al. | 100/88 |
| 4,518,647 A | 5/1985 | Morrison | 428/250 |
| 5,375,640 A | * 12/1994 | Harms | 152/209.12 |
| 5,404,994 A | 4/1995 | Brandenberger | 198/690.2 |
| 5,768,986 A | 6/1998 | Arnold et al. | 100/88 |
| 5,941,168 A | 8/1999 | Kluver et al. | 100/87 |
| 6,021,829 A | * 2/2000 | Rooney | 152/209.12 |

FOREIGN PATENT DOCUMENTS

| | | | | |
|---|---|---|---|---|
| DE | 1065772 | * | 9/1959 | 198/690.2 |
| SU | 963912 | * | 10/1982 | 198/690.2 |

* cited by examiner

*Primary Examiner*—Joseph E. Valenza
(74) *Attorney, Agent, or Firm*—Nancy T. Krawczyk (57) ABSTRACT

The present invention is directed towards a belt having a load-carrying surface located between transverse edges of the belt. The load-carrying surface is comprised of a plurality of ribs arranged in a plurality of overlapping columns extending along the length of the belt. Each rib has a leading edge and a trailing edge extending across the transverse width of the belt, and each rib is defined by a centerline located midway between the leading and trailing edge of the rib. The rib centerline has a non-linear configuration over a majority of the belt's useful lifetime.

10 Claims, 9 Drawing Sheets

LOAD CARRYING BELT

FIELD OF THE INVENTION

This invention relates to belts and more particularly, to the load-carrying surface of belts for use in carrying objects on the surface.

BACKGROUND OF THE INVENTION

In industries, belts are used to transport a variety of objects. These objects can range from large, standard size items such as cardboard boxes to discrete, irregular size items such as loose agricultural products (i.e., hay). It is required that the belts have not only a good gripping surface but must also be durable and self-cleaning. There are many types of roughened belt surfaces; however, many of these surfaces have proven unsatisfactory as their gripping power is reduced with the surface wear and the self-cleaning aspect of the surface has proven to be insufficient.

Examples of known belt surfaces are illustrated in the following U.S. Patents. U.S. Pat. Nos. 2,909,271 and 4,426,926 disclose belts formed with continuous walls forming a plurality of enclosed recesses. U.S. Pat. No. 810,510 discloses several belt surfaces. Each belt surface is provided with a system of ribs arranged so that the ribs have a tendency to shift the material carried by the belt towards the middle of the belt. The illustrated configurations are, for the most part, directional configurations. U.S. Pat. No. 5,768,986 discloses a belt for use with a crop-baling machine. The surface of the conveyor belt is defined by a plurality of continuously extending angled ribs. The ribs extend from one edge of the belt to the opposing edge of belt.

SUMMARY OF THE INVENTION

The present invention is directed towards a belt having a load-carrying surface located between transverse edges of the belt. The load-carrying surface is comprised of a plurality of ribs arranged in a plurality of overlapping columns extending along the length of the belt. Each rib has a leading edge and a trailing edge extending across the transverse width of the belt, and each rib is defined by a centerline located midway between the leading and trailing edge of the rib. The rib centerline has a non-linear configuration over a majority of the belt's useful lifetime.

The rib centerlines of the load-carrying surface may be defined as having at least two separate portions, preferably inclined at equal and opposing angles relative to the transverse belt edges. Alternatively, the rib centerlines may be defined by a line with at least three separate portions, or as a curved line such as a sinusoidal line.

In one aspect of the invention, the load-carrying surface is defined by the ribs in the adjacent columns being rotated in orientation with respect to the immediately adjacent columns.

Also disclosed is an agricultural machine, such as a hay baler that produces round hay bales, employing the belt of the present invention.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
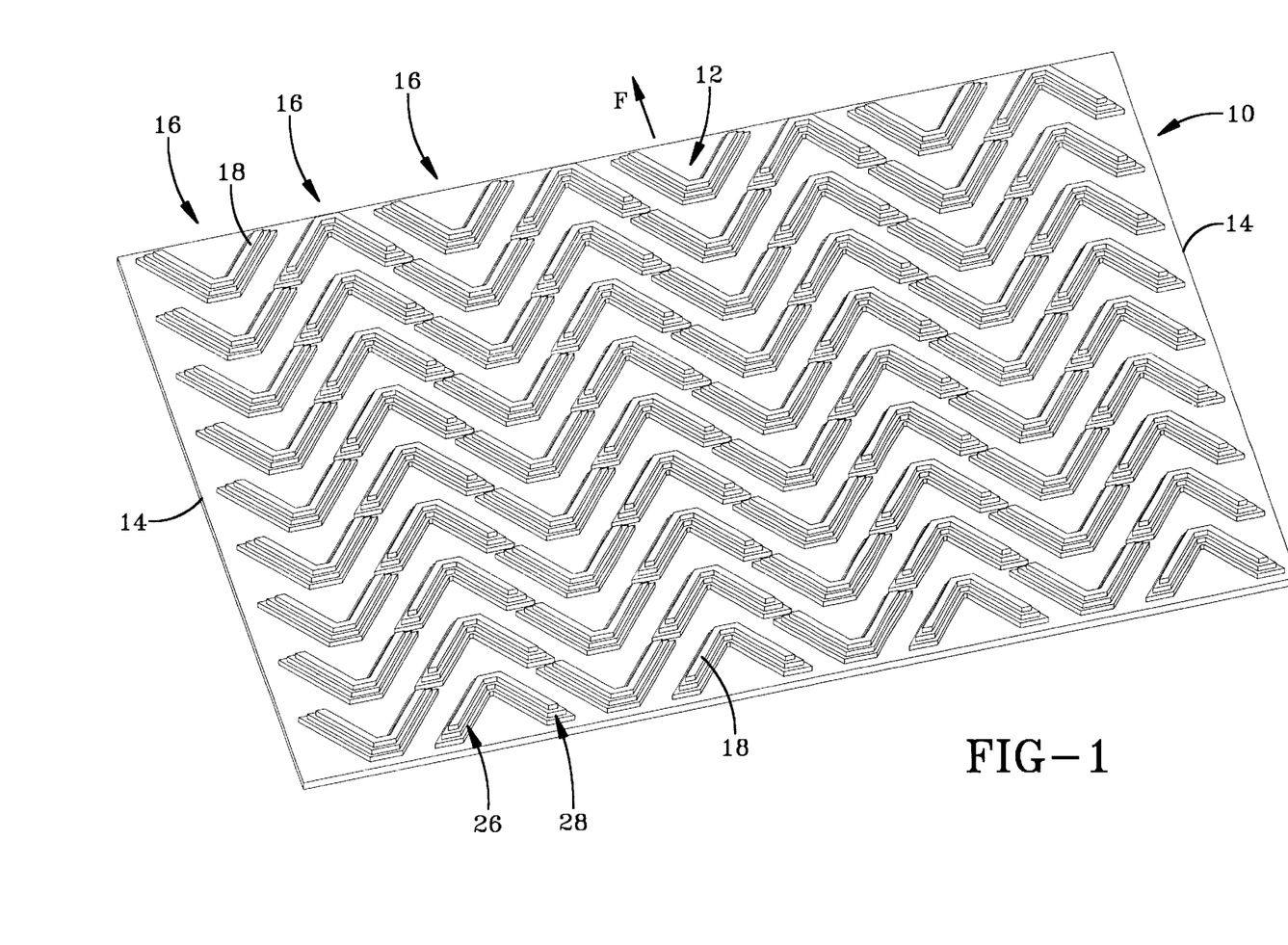
FIG. 1 illustrates a belt in accordance with the present invention.
Figure 4:
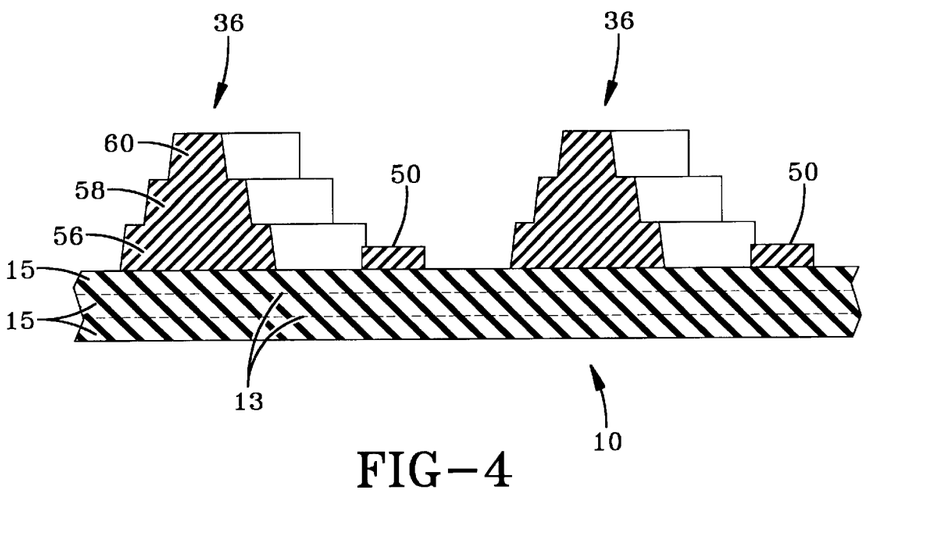
FIG. 4 is a cross-sectional illustration of the belt along line 4—4 of FIG. 2A.

FIG. 1 illustrates a belt 10 in accordance with the present invention. The belt 10 has a load carry surface 12 located between opposing transverse edges 14. When in operation, the belt 10 runs in the direction F indicated by the arrow. The belt 10 is of conventional construction having a carcass of any of the known belt constructions such as several plies of woven fabric or several plies of cord fabric 13 (see FIG. 4), or a combination of woven and cord fabric plies. Such constructions are well known and the particular construction depends upon the specific requirements of the installation for which the belt 10 is to be made. Typically, plies of rubber material 15 are laid between adjacent fabric layers and on both sides of the formed belt carcass. A layer of rubber or plastic material containing sufficient volume to form the ribs of the load carrying surface 12 during vulcanization is applied to the upper surface of the belt 10. The belt 10 is then vulcanized in accordance with the usual practices such as in a platen press with a plate having the desired configurations formed therein or on a continuous rotary type of cure in which the drum against which the belt 10 is urged, contains a design of the desired configuration.

The load carry surface 12 of the belt 10 is defined by a plurality of overlapping columns 16 extending along the running length of the belt 10. The columns 16 contain a plurality of ribs 18. Each rib 18 has a leading edge and a trailing edge; this is more clearly seen illustrated in FIG. 1A. In respect to the traveling direction of the belt, and as the belt 10 travels about either a drive or driven pulley or roll, the leading edge 20 is the edge of the rib 18, at each point along the transverse direction of the rib 18, that travels over the pulley first. The trailing edge 22 is the last edge of the rib 18 that travels about the pulley. A rib's configuration is defined by a centerline 24 located midway between the leading 20 and the trailing 22 edge. In accordance with the invention, the centerline 24 of the ribs 18 has a non-linear configuration. The non-linear configuration of the centerline 24 is maintained over the useful life of the belt 10. The non-linear configuration of the centerline 24 may be defined by any non-linear configuration, including, but not limited to, a two angled line, a multiple angled line (such as a zig-zag), a curved line, a sinusoidal line, or any combination of these configurations. The non-linear configurations of the individual ribs 18 assists in achieving a flexibility of the belt 10 as it travels about the rolls or pulleys, as compared to known ribs that extend transversely across the belt from one belt edge to the opposing belt edge.

Figure 1A:
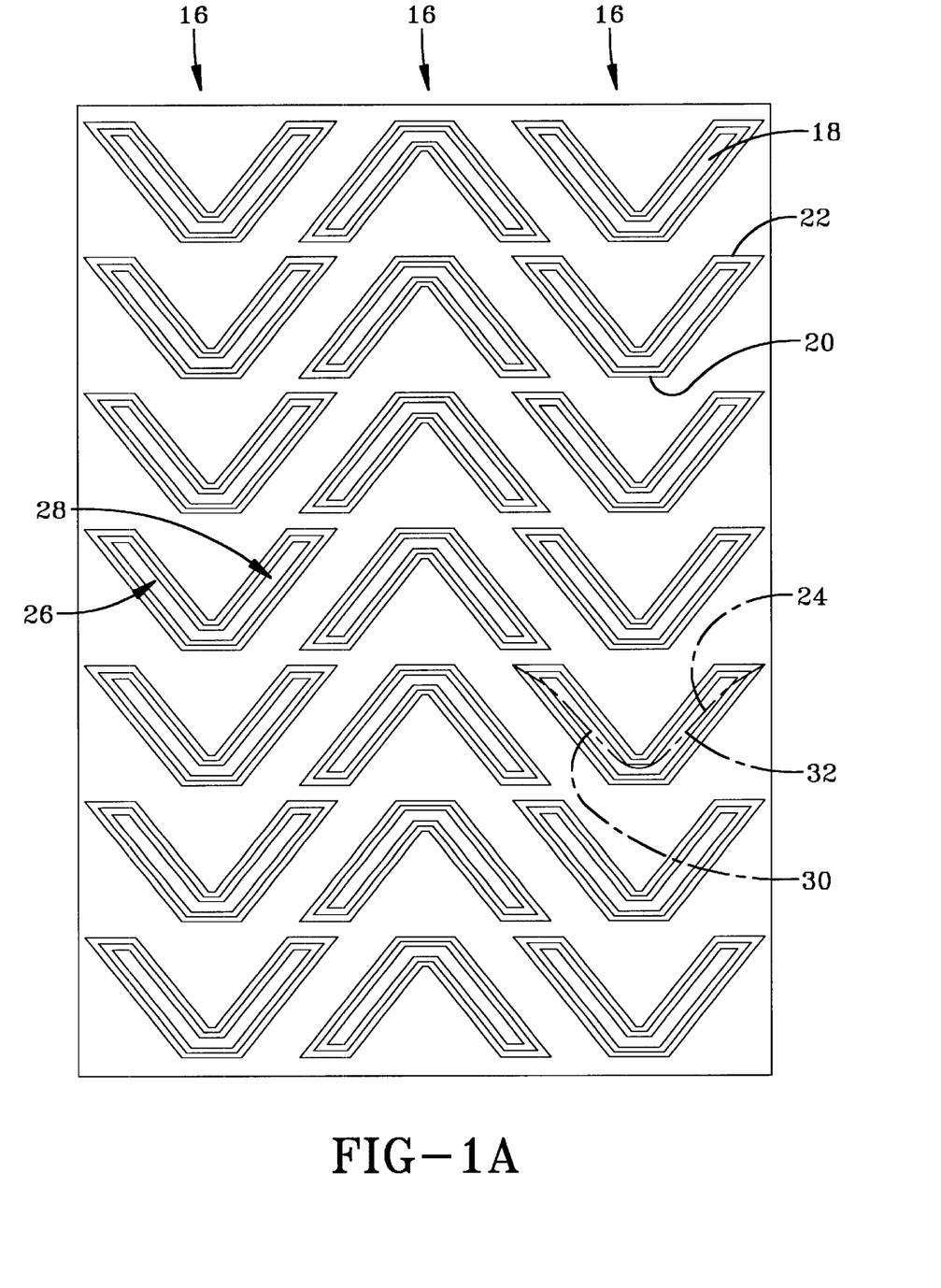
FIG. 1A illustrates a portion of the load-carrying surface of the belt of FIG. 1.

In the embodiment illustrated in FIGS. 1 and 1A, the ribs 18 are substantially v-shaped, with two separately inclined portions 26, 28. In adjacent columns 16, the ribs 18 are similarly shaped, but are rotated 180° relative to the adjacent column 16. The rotated orientation of every other column 16 in the illustrated embodiment permits the columns 16 to overlap in the desired manner. The spacing between adjacent ribs 18 in a single column 16 permits the load carrying surface 12 to pick up and retain objects on the surface, but yet allow the objects to be dislodged from the load carrying surface 12 as the belt 10 travels over a pulley.

The spacing between the adjacent ribs 18 in each column 16, and the rotated orientation between the ribs 18 in adjacent columns creates the flexibility in the transverse direction across the belt 10. Such flexibility in the transverse direction enables the belt 10 to travel easily over any pulleys or rolls.

Figure 1B:
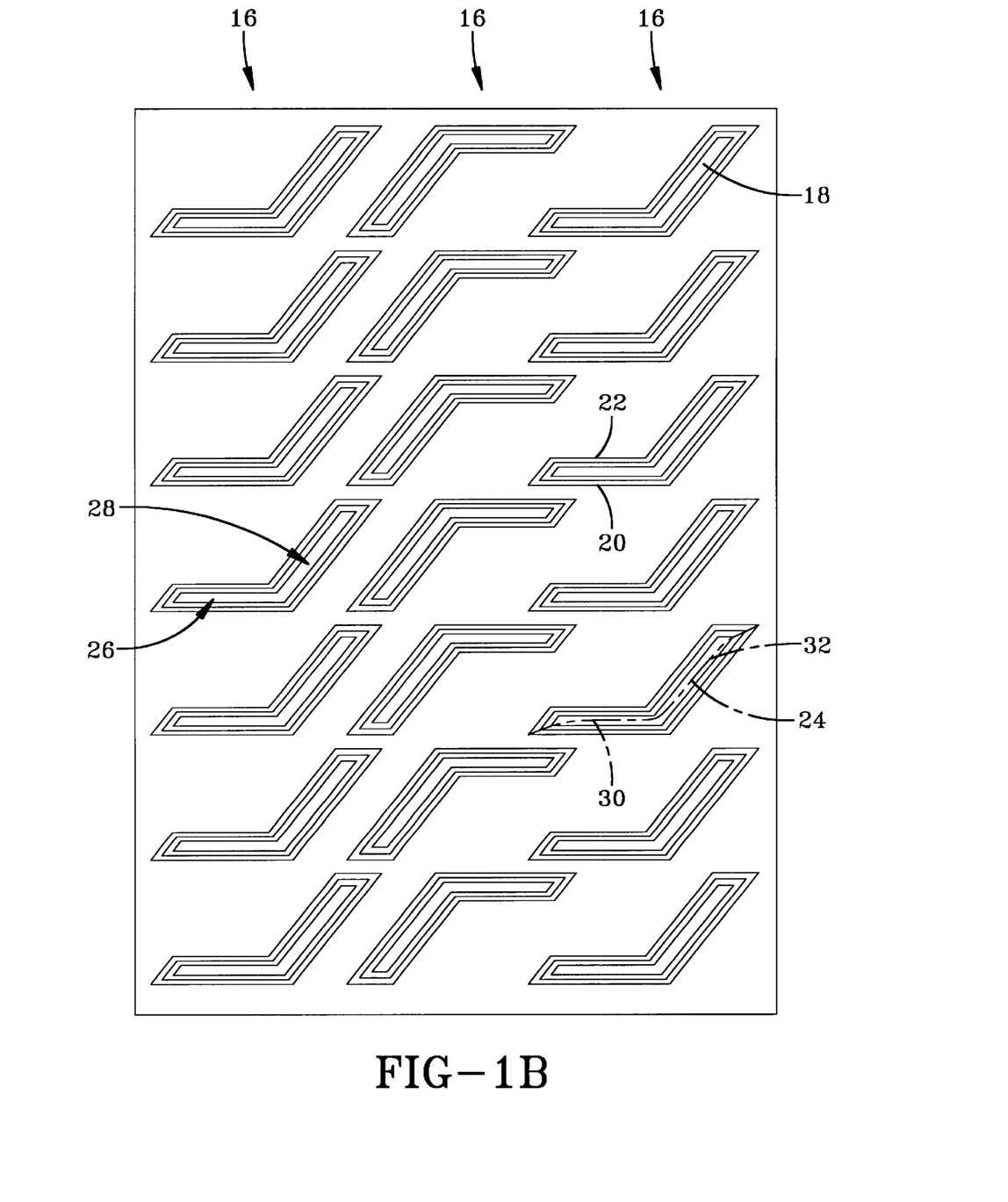
FIG. 1B illustrates a variation of the first embodiment of the load-carrying surface.

The leading edge 20 of the rib 18 is substantially v-shaped, as is the trailing edge 22. The centerline 24, located equi-distance between the leading 20 and trailing 22 edge, is substantially v-shaped, with a slight curvature in each portion of the v-shape. The rib centerline 24 may be defined as having two separate portions 30, 32, the portions 30, 32 being inclined relative to each other. The portions 30, 32 are illustrated at identical inclination angles, however, the different portions 30, 32 may be inclined at different angles. In the illustrated embodiment, each portion 30,32 of the centerline 24 is inclined at angles of 30° to 90° relative to the transverse belt edges 14, or the traveling direction of the belt 10. Preferred inclination angles for each portion are in the range of 450 to 80°. In another two-portion centerline rib 18, see FIG. 1B, the ribs 18 have a v-shaped configuration, however, both rib portions 26, 28 and both centerline portions 30, 32 are inclined at different angles relative to the transverse belt edges 14.

Figure 2:
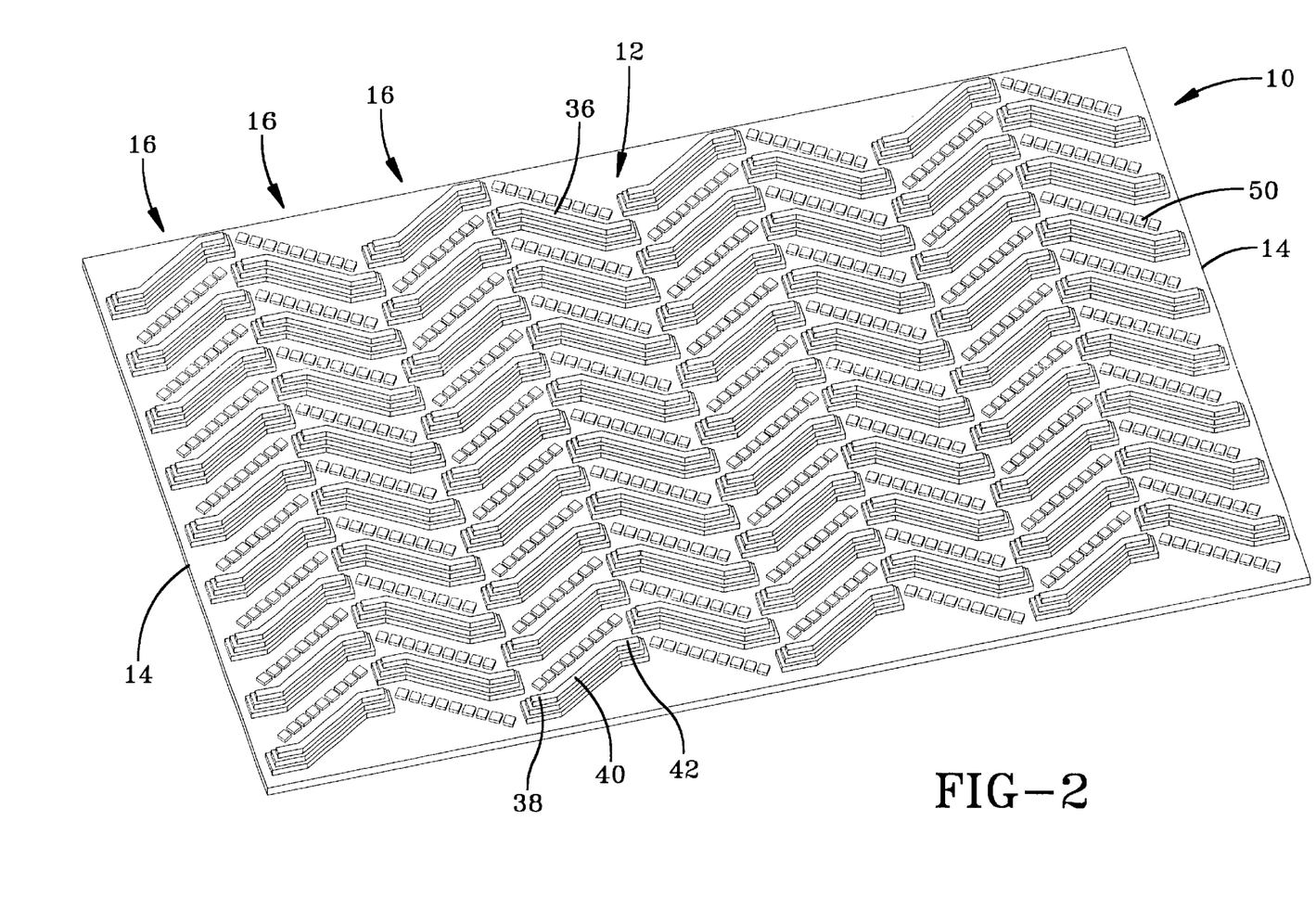
FIG. 2 illustrates a belt in accordance with another embodiment of the present invention.
Figure 2A:
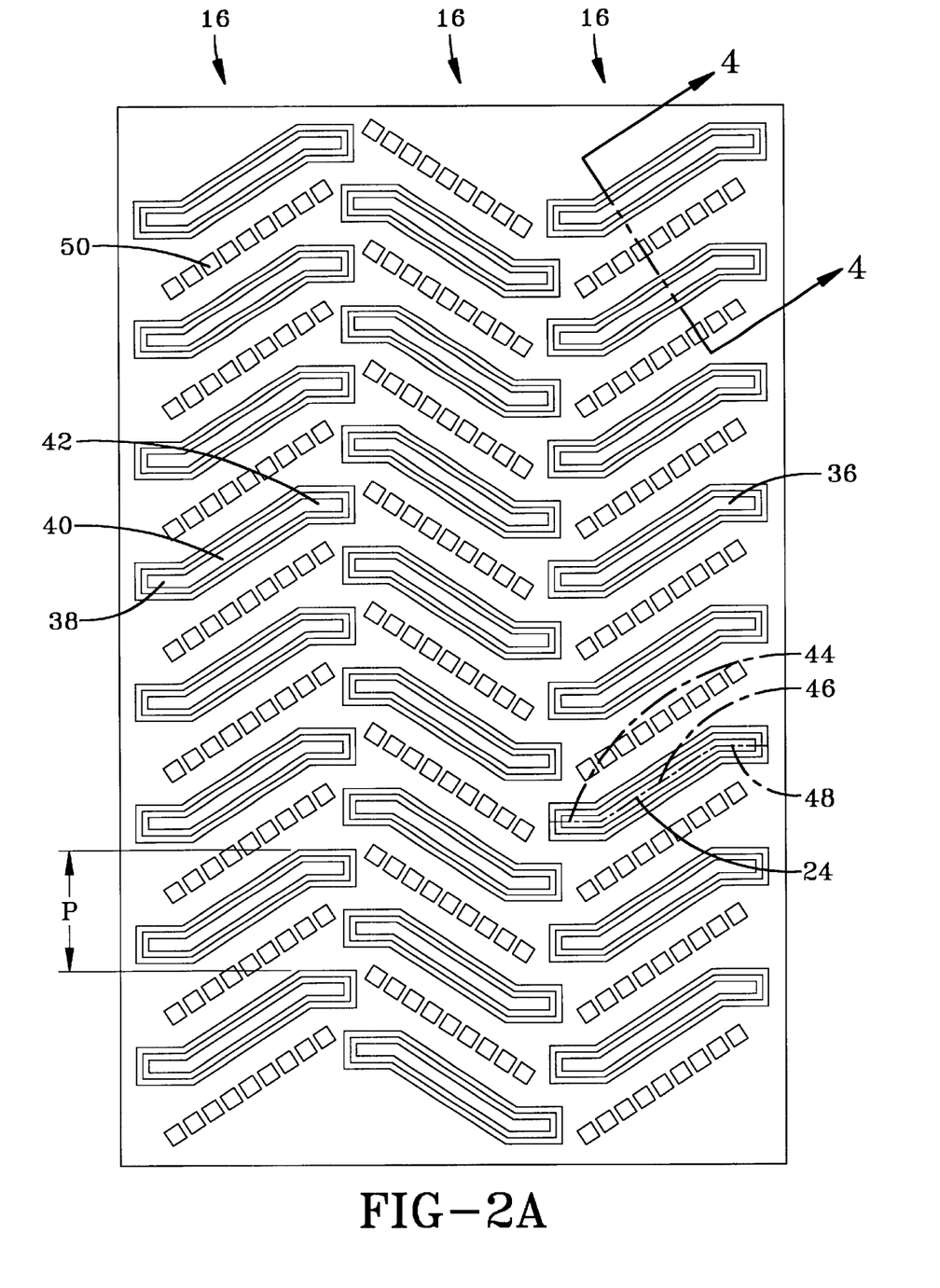
FIG. 2A illustrates a portion of the load-carrying surface of the belt of FIG. 2.
Figure 2B:
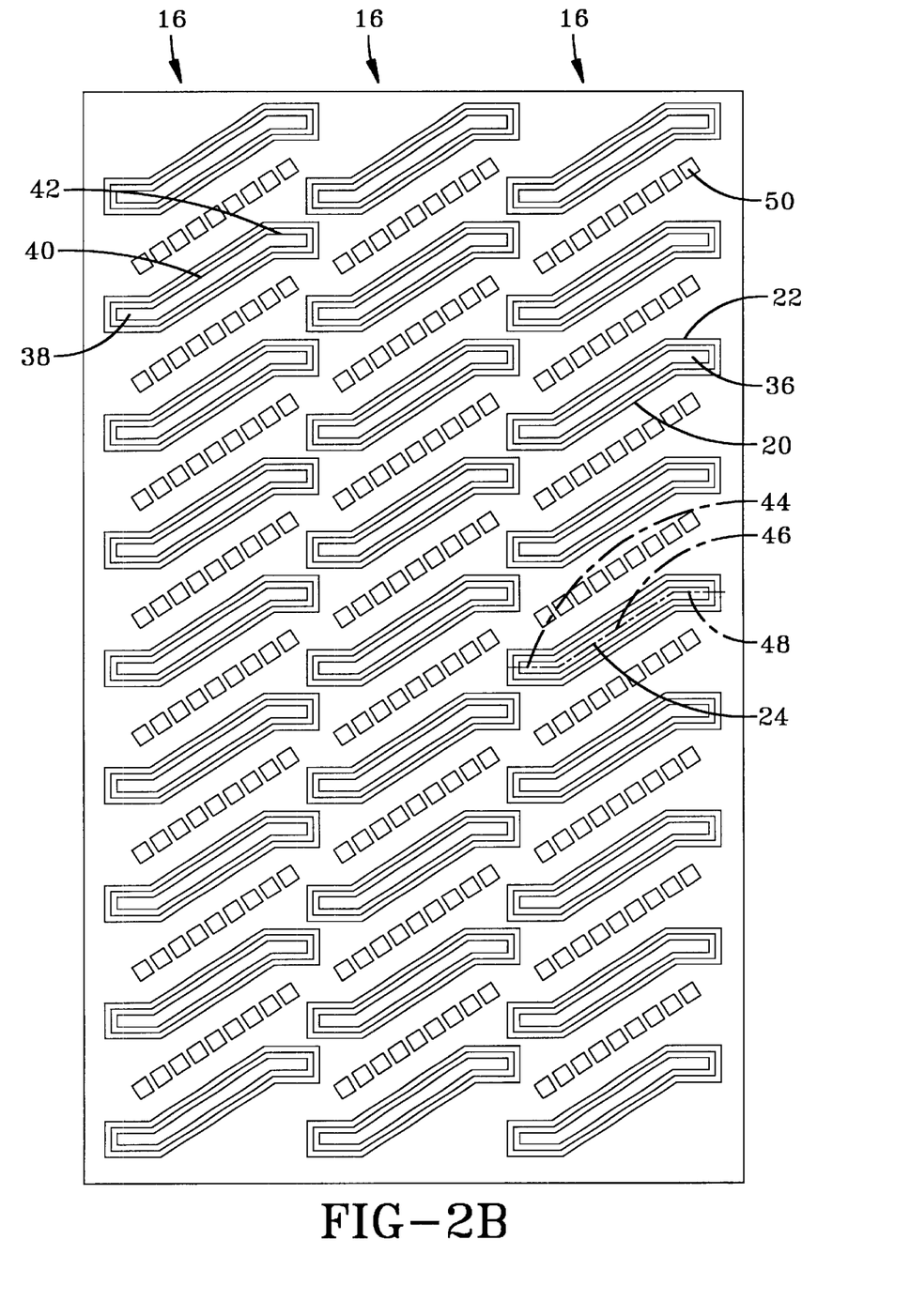
FIG. 2B illustrates a variation of the second embodiment of the load-carrying surface.

In the embodiment of FIG. 2, the ribs 36 are configured with three angular portions 38, 40, 42, two of which are identical. Adjacent rib columns 16 are arranged so that the edges of the ribs 36 in adjacent columns 16 overlap, creating an interlocking relationship between the columns 16. This relationship is more clearly illustrated in FIG. 2A. The ribs 36 in the adjacent columns 16 are staggered mirror images of each other; however, the ribs 36 in the adjacent columns 16 may be of identical orientation, as illustrated in FIG. 2B. The overlapping relationship of the columns 16 creates a hinge point between the columns 16, providing flexibility along the running direction of the belt 10. Due to the substantially transversely extending configuration of the ribs 36, flexibility in the transverse direction is maintained.

As the leading and trailing 20, 22 edges of the ribs have identical configurations (see FIG. 2B), the centerline 24 of the ribs 36 has an identical configuration to the leading 20 and trailing 22 edges. Just as each rib 36 may be defined as having three angular portions, so may the centerline 24 of each rib 36 be so defined. In the illustrated embodiment, the first and third portions 44, 48 of the rib centerlines 24 are inclined at an angle of approximately 90° relative to the transverse edge of the belt. These edge portions 44, 48 can also be more inclined with respect to the transverse edges of the belt, so long as the end portions 44, 48 are inclined at an angle of 10° to 90° relative to the second portion 46. The second portion 46, connecting the first and third portions 44, 48, is inclined at an angle less than 90°, but greater than 10°.

The pitch length P of the rib 36, as measured from a single location to the identical location of the adjacent rib 36 in the same column 16, must be sufficient to achieve the desired interlocking relationship between the adjacent columns 16. As illustrated, the pitch length P of the rib 36 is measured from the trailing edge of one rib to the trailing edge of the adjacent rib 36 in the same column 16. The pitch length P of the ribs 36 in the adjacent column 16 is identical, but offset in the traveling direction F of the belt 10 from the pitch length P in the adjacent columns 16.

Located between the ribs 36 in each column 16 are pluralities of aligned square plugs 50. The plugs may be aligned in one of several methods. As illustrated in FIG. 2, the plugs 50 may be aligned along a single direction. The plugs 50 may also be aligned to follow the inclinations of the adjacent ribs 36. The height of the plug, as measured from the body surface of the belt, is less than the height of the adjacent ribs 36, see FIG. 4. The overall shape of the plugs 50, as viewed from above may be of any simple geometrical configuration, such as a square, rectangle, triangle, circle, or polygon. While only the second embodiment of the present invention, where the rib centerline is defined by three portions, is illustrated as having the plugs 50, all of the disclosed embodiments of the non-liner centerline ribbed belts may be provided with the plugs 50.

Figure 3A:
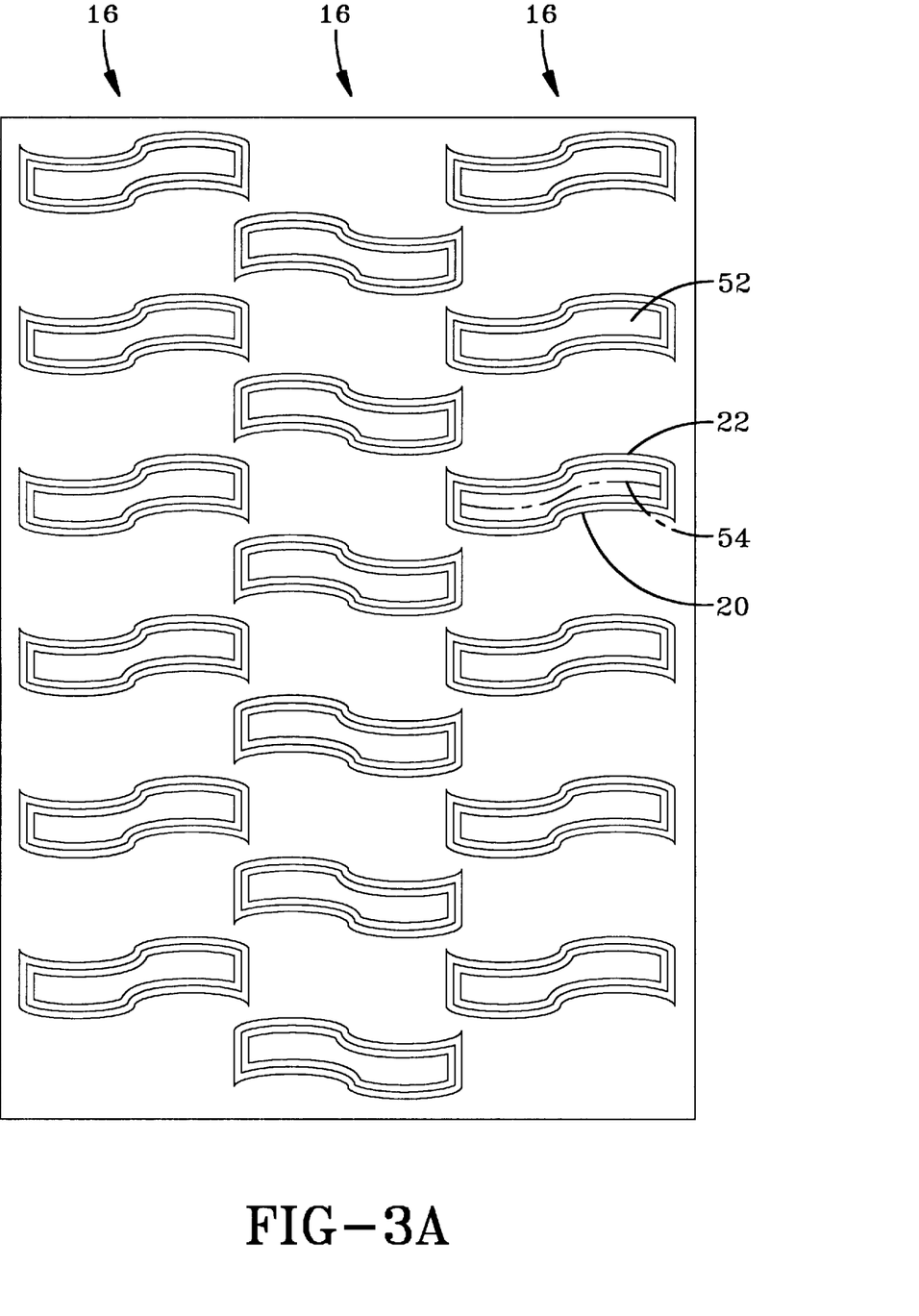
FIGS. 3A and 3B illustrate variations of a third embodiment of the present invention.
Figure 3B:
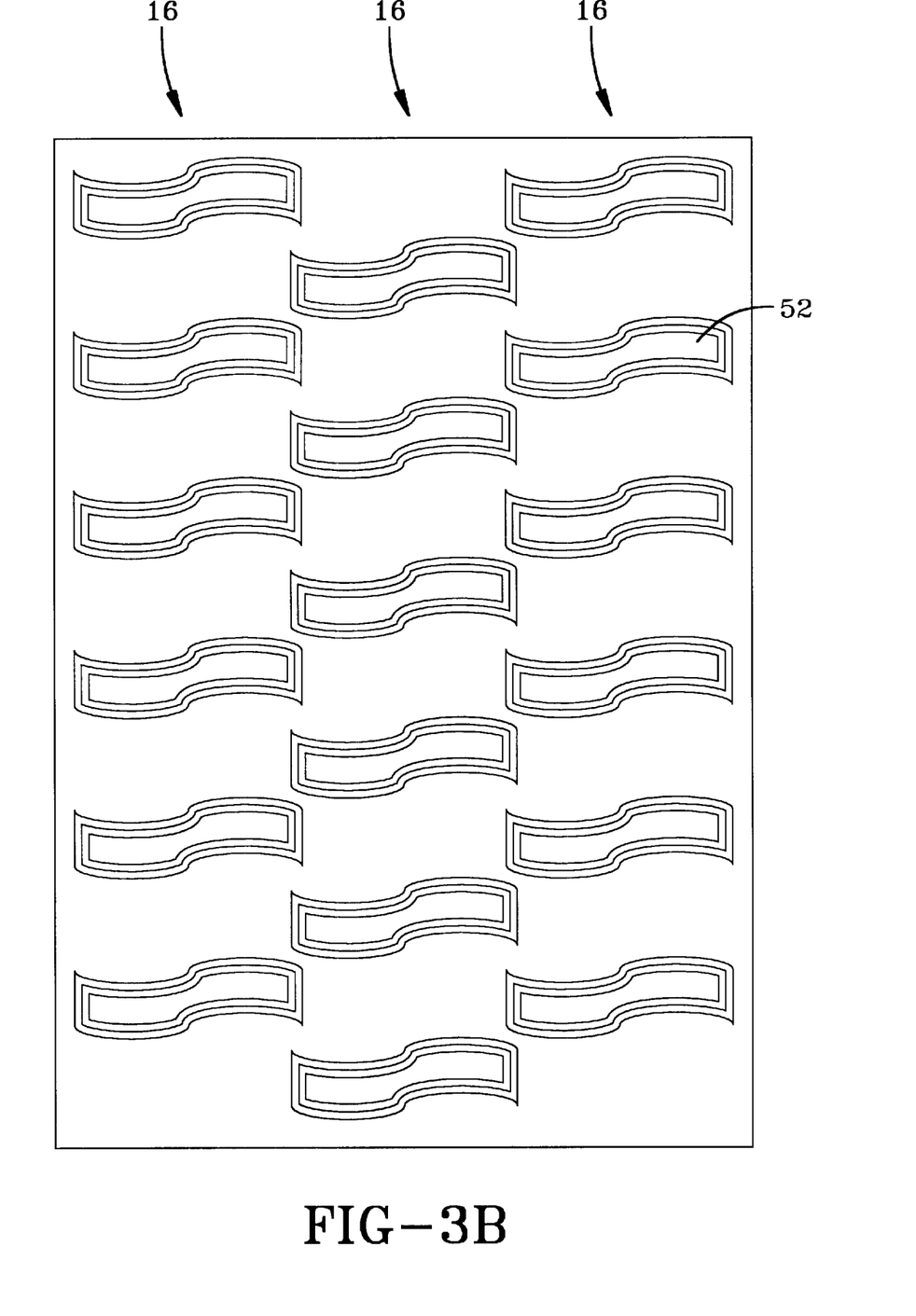

In the embodiment of FIG. 3, the ribs 52 are configured with curved leading and trailing edges 20,22. As in the previous embodiments, the ribs 52 in adjacent columns are staggered and overlap, creating an interlocking relationship between the columns 16. The ribs 52 in the adjacent columns 16 may be either mirror images of each other or of identical configuration. Due to the identical leading and trailing edges 20,22, the centerline 54 has a curved configuration. The configuration of the centerline 54 is best described as sinusoidal, wherein the slope of the centerline is constantly changing. While not illustrated, plugs 50 may be located between adjacent ribs 52. Each individual rib, 18, 36, or 54, of the different embodiments, is formed of symmetrically stacked truncated isosceles triangular sections 56, 58, 60, see FIG. 4. Each of the sections 56, 58, 60 become progressively smaller as the distance from the carcass or body surface increases. The upper edges of the outermost sections of each of the ribs 18,36, or 54 engage the article being carried on the belt 10 and effectively grip the article.

In the illustrated rib stacked rib structure, as the belt 10 wears through one section 60, the section below 58, 56 forms another rib for the belt surface 12. The stepped sections 56, 58, 60 also stabilize the ribs 18, 36, or 54 so that they do not fold back completely and become less effective to grip or "bite" because of this folding. The larger sections 56, 58 immediately below the topmost section 60 form a stable base for the sections above and assist in localizing the flexing so that the rib 18, 36, or 54 is more effectively urged into contact with the article carried on or by the belt 10.

Alternatively, each rib 18, 36, or 54 may be formed with a different cross-sectional form, such as a triangle, or a triangular section with the upper portion removed. Similar to the ribs 18, 36, 54, the intermediate plugs 50 may also be formed of symmetrically stacked square sections or truncated isosceles triangular sections.

The inventive belt 10 may be used in any type of environment where it is desired to have a belt 10 with a load carrying surface 12 that will assist in transporting the items, and which is also self-cleaning. The belt 10 may be used in agricultural machines wherein the belt 10 is driven around a plurality of rolls, such as the crop baler machine described in U.S. Pat. No. 5,768,986.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is; therefore, to be understood that changes can be made in the particular embodiments described which would be within the fully intended scope of the invention as defined by the following appended claims.

What is claimed is:

1. A belt having a load-carrying surface located between transverse edges of the belt, the surface comprising a plurality of ribs arranged in a plurality of overlapping columns extending along the length of the belt, each rib having a leading edge and a trailing edge extending across the transverse width of the belt, each rib having a centerline located midway between the leading and trailing edge of the rib, the carrying surface being characterized by:

the rib centerline having a non-linear configuration over a majority of the belt's useful lifetime, and the rib centerlines in at least two columns having the same orientation.

2. A belt in accordance with claim 1 wherein the surface is further characterized by the rib centerline being defined by at least two separate portions.

3. A belt in accordance with claim 2 wherein the rib centerline is characterized by the two separate portions are inclined at equal and opposing angles relative to the transverse edges of the belt.

4. A belt in accordance with claim 1 wherein the surface is further characterized by the rib centerline being defined by at least three separate portions.

5. A belt in accordance with claim 1 wherein the surface is further characterized by the rib centerline being defined as a curved line.

6. A belt in accordance with claim 5 wherein the rib centerline is characterized as a sinusoidal line.

7. A belt in accordance with claim 1 wherein the surface is further characterized by the ribs in adjacent columns being rotated in orientation with respect to the immediately adjacent columns.

8. A belt having a load-carrying surface located between transverse edges of the belt, the surface comprising a plurality of ribs arranged in a plurality of overlapping columns extending along the length of the belt, the ribs in adjacent columns having the same shape but not necessarily the same orientation, and each rib having a leading edge and a trailing edge extending across the transverse width of the belt, each rib having a centerline located midway between the leading and trailing edge of the rib wherein the rib centerline has a non-linear configuration.

9. A belt in accordance with claim 8 wherein the rib centerline is defined by one of the following configurations of the group consisting of two separate portions, three separate portions, and a curved line.

10. A belt in accordance with claim 8 wherein the ribs in adjacent columns are rotated in orientation with respect to the immediately adjacent columns.

* * * * *